United States Patent [19]
Dunder

[11] Patent Number: 5,443,800
[45] Date of Patent: Aug. 22, 1995

[54] PULSE TRAIN GENERATING CIRCUIT FOR CONTROL OF AN OZONE GENERATING MEANS

[75] Inventor: Ove K. Dunder, Mississauga, Canada

[73] Assignee: Liftech Corporation, Canada

[21] Appl. No.: 69,775

[22] Filed: Jun. 1, 1993

[51] Int. Cl.⁶ .................. B01J 19/12; H01T 23/00
[52] U.S. Cl. .................. 422/186.16; 422/186.15; 361/235; 327/172; 327/291
[58] Field of Search .......... 422/186.15, 186.16; 328/193, 195, 196; 361/235

[56] References Cited

U.S. PATENT DOCUMENTS

| 4,680,694 | 7/1987 | Huynh et al. | 363/136 |
| 4,682,266 | 7/1987 | Huynh et al. | 361/235 |
| 4,713,220 | 12/1987 | Huynh et al. | 422/186.16 |
| 4,752,866 | 6/1988 | Huynh et al. | 363/138 |
| 5,094,822 | 3/1992 | Dunder | 422/186.22 |

FOREIGN PATENT DOCUMENTS

| 979486 | 12/1975 | Canada | 321/1.1 |
| 1050099 | 3/1979 | Canada | 317/5 |

Primary Examiner—Donald P. Walsh
Assistant Examiner—Daniel Jenkins
Attorney, Agent, or Firm—Klauber & Jackson

[57] ABSTRACT

A pulse train generating circuit for accurately controlling the ozone production of an ozone generator, is disclosed. The ozone generator may be an electrode type ozone generator or a laser type ozone generator. The circuit generates a first signal indicative of the target rate of ozone production. A control signal of a predetermined length first time period having enable and disable portions is then generated. The temporal sum of the enable portions in each separate time period of the control signal is representative of the target rate of ozone production. A train of pulses corresponding to the enable portions of the control signal is passed by a pulse train gate, and is fed to the ozone generator so as to cause generation of ozone. The amount of ozone generated during the first time period is directly related to the temporal sum of the pulses in the train of pulses, so as to thereby provide accurate control of the amount of ozone being generated.

15 Claims, 2 Drawing Sheets

PULSE TRAIN GENERATING CIRCUIT FOR CONTROL OF AN OZONE GENERATING MEANS

FIELD OF THE INVENTION

This invention relates to ozone generators and more particularly to electronic circuits for accurately controlling the generation of ozone gas molecules by an ozone generator.

BACKGROUND OF THE INVENTION

Oxygen is an allotropic element, with the most common form of the gas being the diatomic form ($O_2$). Ozone ($O_3$) and singlet oxygen ($^1O_2$) are other forms of the gas that occur naturally and that can be created artificially. Ozone is the triatomic form of oxygen and is relatively unstable. Several methods of forming ozone are well known.

The benefits of ozone gas molecules ($O_3$) are well known in the medical community for treatment of blood and human tissue in order to fight disease or other pathogens, or at least to ameliorate the effects thereof. Many diseases have been shown to be positively effected through the administration of ozone. Ozone has been found to kill cancer cells, be effective against various viruses and fungi, and to inactivate a wide variety of bacteria including pseudomonas aeruginosa, staphylococcus aureus and mycobaterium tuberculosis. Ozone has also been found to have disruptive effects on malignant tumour cells. The administration of ozone is also known to have beneficial effects to a patient's health in general by way of stimulating oxygen metabolism. It has also been shown that the administration of ozone and singlet oxygen to a healthy patient, through direct inhalation, can help prevent various diseases, such as those discussed above.

The introduction of too much ozone into the human body is not desirable, however. It is therefore very important to be able to regulate the concentration of ozone in an aliquot of blood, or other carrier liquid, that is being administered to a patient. In order to properly and accurately regulate the concentration of ozone in an aliquot of blood, it is necessary to be able to accurately control the amount of ozone introduced into the aliquot of blood, and therefore accurately regulate the amount of ozone generated by the ozone generator being used.

An electrode type ozone generator typically has a pair of electrodes separated by a suitable gap, with the $O_2$ gas that is to be ozonated passed along this gap between the electrodes. High potential voltage pulses are introduced across the electrodes in order to cause small sparks of electricity to jump between the electrodes and thereby excite the electrons of the $O_2$ molecules, and thus cause ozone molecules to be created. The small sparks of electricity form a visible corona around and between the electrodes.

One method known in the prior art that is used to attempt to control the mount of ozone generated by an ozone generator is the regulation of the voltage across the electrodes of the ozone generator. Unfortunately, it has been found that electronically varying the AC high voltage across the electrodes is difficult to do in an accurate manner. Typically, triacs are used to drive the electrodes. It is not possible to vary the phase angle to the gate of such triacs in small increments in an accurate manner.

Another method that is used to control the amount of ozone production of a corona discharge type ozone generator is to vary the frequency of the voltage pulses applied to the electrodes. This method is slightly more accurate than regulation of the voltage across the electrodes, however, this method offers a very limited range because of the frequency characteristics of the circuitry supplying the voltage pulses to the electrodes. The components in such circuitry generally must be chosen to construct a circuit to operate at a predetermined frequency. Resultingly, the pulses that are generated and sent to the electrodes are not properly produced outside a limited frequency range around this predetermined frequency and correspondingly ozone production tends to drop off considerably outside of this range. Varying the frequency of the pulses applied to the electrodes therefore works only over a small frequency range, which corresponds to a small range in change of ozone production that is possible.

It is also possible to vary the flow of oxygen gas molecules ($O_2$) into an ozone generator by way of opening or closing a valve, with the flow of oxygen gas molecules through the valve being indicated by a flow meter. However, due to inherent inaccuracy of flow meters, this method does not provide for an accurate way of controlling ozone production. Further, only a limited range of adjustment is possible since for many applications, low pressures of oxygen are used.

Therefore, it is not known how to accurately regulate the amount of ozone generated by an electrode type ozone generator.

PRIOR ART

Canadian Patent 1,050,099 issued Mar. 6, 1979 to LOTHER, discloses a high frequency power supply for a corona generator. This high frequency power supply uses at least one pair of silicon controlled rectifiers to generate voltage pulses to be applied to space electrodes, with high frequency pulses being input into the gates of the silicon controlled rectifiers. The circuit disclosed therein is not suitable for varying and accurately controlling the output of an ozone generator.

Canadian Patent 979,486 issued Dec. 9, 1975 to LOTHER, discloses a solid state frequency converter for a corona generator. In this apparatus, a silicon controlled rectifier is employed to apply a higher frequency current to a corona generator. The source of power is a lower frequency AC power source. It is recognized in this patent that increasing the frequency of pulses to a corona generator causes increased heat, which is often unacceptable. It is also disclosed that decreasing the voltage while increasing the frequency will give an equivalent ozone output and is a means of controlling the heat generated by the ozone generator.

U.S. Pat. No. 5,094,822 issued Mar. 10, 1992 to DUNDER, the inventor herein, discloses an improved ozone generator that employs the silent corona discharge method to generate ozone. A grounded electrode and a high voltage electrode are located inside a generating chamber assembly with the high voltage electrode centrally located and the grounded electrode disposed in circumferentially spaced relation therearound.

The high voltage electrode is suspended by four ceramic spacers so that the potential area for surface contamination caused by impurities in the oxygen gas that is used is limited to the spacers. Further, the high voltage electrode is constructed with a hollow core and perforated sides so as to allow the oxygen gas molecules to be removed before the formed ozone state to dissociate and before nitric acid has time to form.

The high voltage electrical potential between the high voltage electrode and the grounded electrode causes a corona discharge type electrostatic field to be created therebetween. Oxygen gas molecules are passed between the high voltage electrode and the grounded electrode so as to cause the oxygen gas molecules to be excited by the electrostatic field, thus creating ozone gas molecules.

SUMMARY OF THE INVENTION

The present invention provides an electronic control circuit for accurately controlling the rate of generation of ozone gas molecules, for use in conjunction with an ozone generating means. The electronic control circuit comprises a source of electrical power, and an ozone production adjustment means for generating a first signal which is indicative of a target rate of ozone gas molecule production. A control signal generation means accepts the first signal from the ozone production adjustment means, and generates a control signal a predetermined length first time period and comprising a plurality of consecutive enable and disable portions, where the temporal sum of the enable portions within the first time period is representative of the first signal from the ozone production adjustment means. A pulse generating means generates pulses that are fed into a pulse train gate means having conductive and non-conductive states, where the conductive state is enabled by the enable portion of the control signal a train of pulses from the pulse generating means is passed by the pulse train gate means, and wherein the pulses in the train of pulses correspond to the enable portions of the control signal within the first time period. In response to the enable portion of the control signal from the control signal generation means, the pulse train gate means passes the train of pulses, wherein the time period of one cycle of the first and second portions of each of the pulses is a second time period which is shorter than the first time period. In response to the disable portion of the control signal from the control signal generation means, the pulse train gate assumes its non-conductive state. The train of pulses that is passed by the pulse train gate means is fed to the ozone generating means so as to cause generation of ozone therewithin during the occurrence of the pulses. The amount of ozone, generated during the first time period is directly related to the temporal sum of the enable portions of pulses in the train of pulses passed by the pulse train gate means during the first time period, so as to thereby provide accurate control of the amount of ozone gas molecules being generated.

BRIEF DESCRIPTION OF THE DRAWINGS

Embodiments of the present invention will now be described by way of the accompanying drawings, in which.

DETAILED DESCRIPTION OF THE PREFERRED EMBODIMENTS

Figure 1:
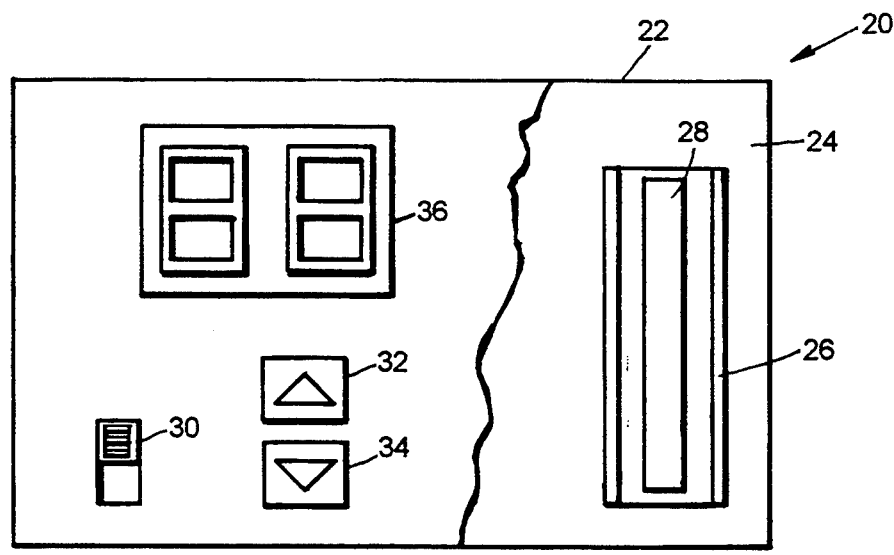
FIG. 1 is a partially broken away elevational view of the ozone generator of the present invention.

Reference will now be made to FIG. 1, which shows a representative ozone generating means 20. Specifically, a typical corona type ozone generator is shown, which can readily be used in conjunction with the electronic control circuit of the present invention. The corona type ozone generator comprises a protective housing 22, which can be of any suitable form and size, that covers the electrical control circuit of the present invention, and also covers the ozone generating chamber 24 that houses a pair of spaced apart electrodes 26,28 therein. This pair of spaced apart electrodes 26,28 is used to ultimately generate ozone by way of electrical stimulation of oxygen gas molecules.

On the exterior of the protective housing 22 is a set of control switches, including an ON-OFF switch 30 and a pair of control switches 32,34 that act as part of an ozone production adjustment means. Preferably, the control switches are momentary contact single-pole single-throw switches that are in electrically conductive relation with the microprocessor in the ozone generator, which will be described in greater detail subsequently. One switch 32 is an "increase" switch and the other switch 34 is a "decrease" switch. The target rate level of ozone to be generated is displayed on a liquid crystal display 36, which thereby acts as a target rate display means. Depressing either of the "increase" or "decrease" control switches causes a corresponding change in the target rate of ozone production. In the preferred embodiment, the target rate is expressed as a whole number from 1 to 42 inclusive, as will be explained in greater detail subsequently.

Figure 2:
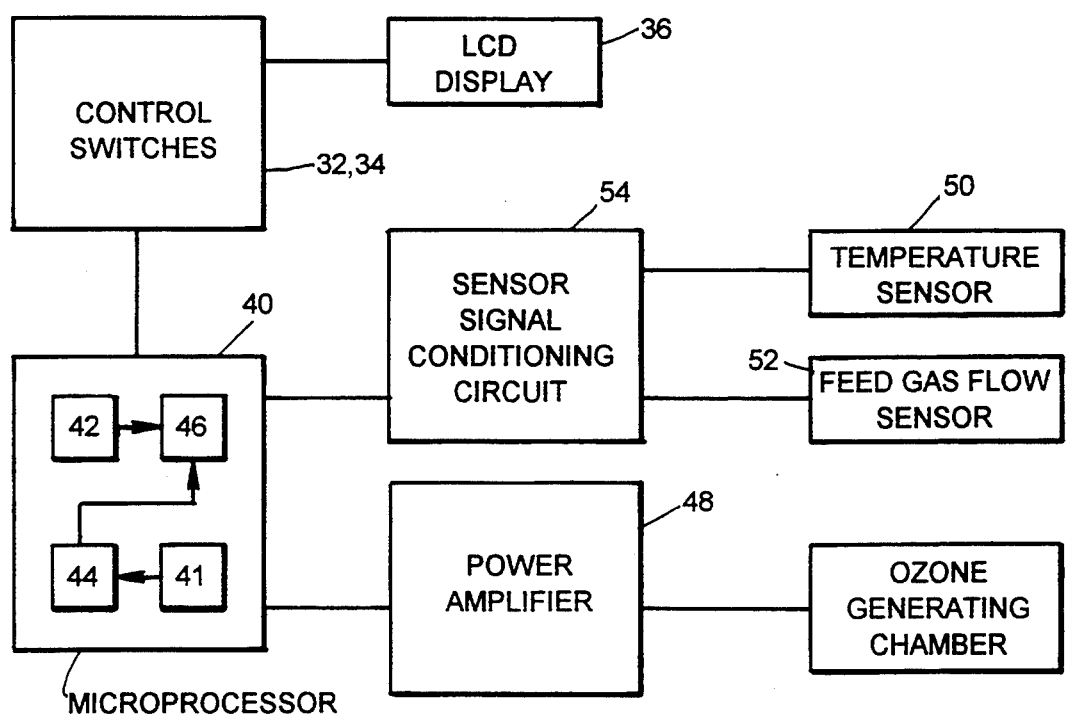
FIG. 2 is a box schematic of the ozone generator of FIG. 1.
Figure 3:
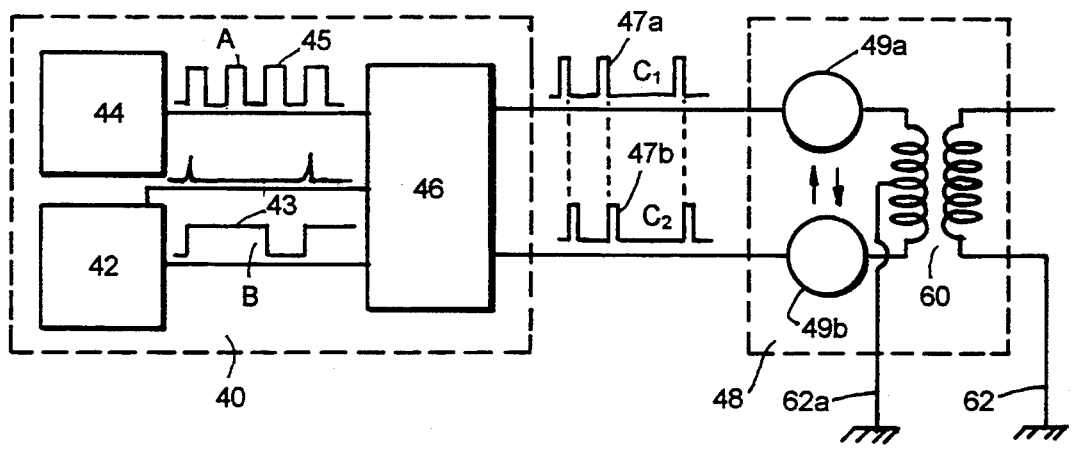
FIG. 3 is a functional schematic of a portion of the circuit of FIG. 2, showing a practical embodiment thereof.
Figure 4:
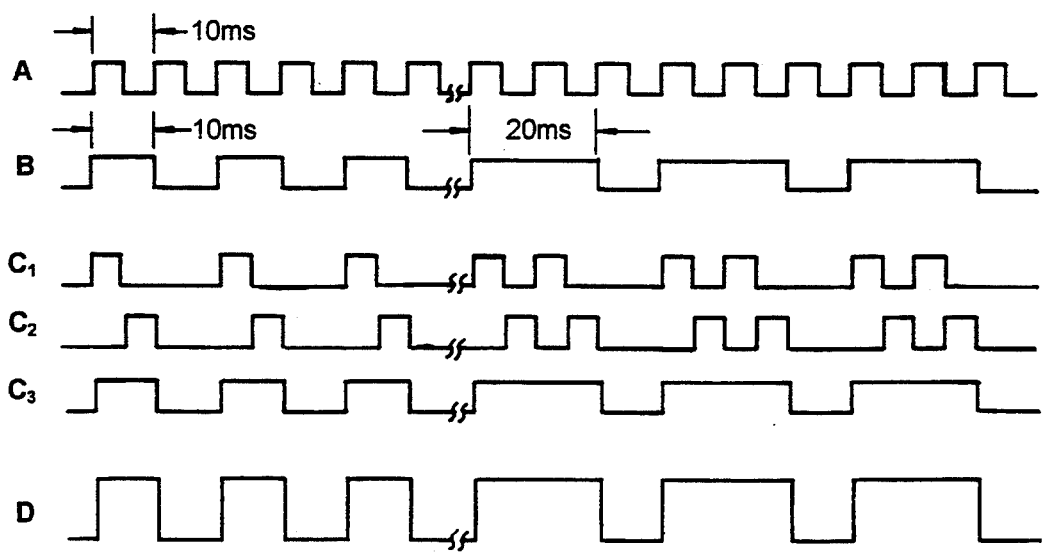
FIG. 4 is a timing diagram associated with the various components of the ozone generator of FIG. 1.

The general configuration of the electronic control circuit of the present invention will now be described with reference to FIG. 2. The control switches 32,34 and the microprocessor 40 together form an ozone production adjustment means for generating a first signal which is indicative of the target rate of ozone gas molecule production. A target rate of anywhere from 1 to 42 is chosen by way of the control switches and is displayed by the LCD display 36. The microprocessor 40 also comprises control signal generation means 42 for accepting the first signal from the ozone production adjustment means and for generating a control signal that is representative of the first signal, which control signal is shown in FIG. 4, trace B. The characteristics of the various pulse signals will be described in greater detail subsequently with specific reference to traces A, B, $C_1$, $C_2$, $C_3$ and D of FIG. 4, with reference to FIG. 3.

Within the microprocessor is also a pulse generating means 44 that generates pulses, preferably square wave pulses, where the period of each pulse, including a binary "1" portion and a binary "0" portion, is 10 milliseconds. This is essentially a clock pulse, as can be seen at trace A of FIG. 4.

The control signal from the control signal generation means 42 and the pulses from the pulse generating means 44 are fed into a pulse train gate means 46, which has a conductive state and a non-conductive state. The pulse train gate means 46 is configured to function as an AND gate, and passes a binary "1" signal in its conductive state and does not pass a signal—or in other words outputs a binary "0" signal—in its non-conductive state.

In the non-conductive state, pulses from the pulse generating means 44 are not passed by the pulse train gate means 46. This non-conductive state occurs in response to the disable portion of the control signal from the control generation means.

The control signal generation means 42 also generates a synchronizing signal that is input to the pulse train gate means 46. The pulse train gate means 46 accepts the synchronizing signal and uses it to synchronize the control signal with the train of pulses such that the onset of the enable portion of the control signal coincides with the beginning of a single pulse, in the train of pulses.

The train of pulses is then passed to a high voltage pulse generating means 48 that produces high voltage electrical pulses, which are depicted at trace D of FIG. 4, corresponding to each pulse of the train of pulses. These high voltage electrical pulses are imposed across the pair of spaced apart electrodes 26,28 so as to create a corona between the electrodes 26,28 and correspondingly generate ozone within the ozone generating chamber 24 during each occurrence of the high voltage electrical pulses. The amount of ozone generated during the first time period is proportional to the number of pulses in the train of pulses passed by the pulse train gate means during the first time period, which in turn is representative of the target rate level of ozone generation displayed by the target rate display means, so as to thereby provide accurate control of the amount of ozone gas molecules being generated.

The functioning of the electronic control circuit of the present invention will now be discussed in greater detail with reference to FIGS. 3 and 4. The control signal generation means 42 generates a control signal 43, which is fed into the pulse train gate means 46. The control signal 43 is also depicted at trace B of FIG. 4. The control signal 43 has a first time period of predetermined length, which in the preferred embodiment is about 500 milliseconds and comprises a series of consecutive enable and disable portions, with the enable portion preferably being a binary "1" and the disable portion preferably being a binary "0". The time period of one cycle of the enable and disable portions (therefore comprising one enable portion and one disable portion) has a second, shorter, time period. In essence, the enable portions are pulses and the disable portions are spaces or gaps between the pulses. The pulses are either 10 milliseconds or 20 milliseconds, and the gaps are at least 10 milliseconds. Thus, the time period of one cycle of the first enable and the second disable portions of each of the pulses is a second time period of either 20 milliseconds, with a 10 millisecond enable portion and a 10 millisecond disable portion; or 30 milliseconds, with a 20 millisecond enable portion and a 10 millisecond disable portion. The second time period is of a shorter duration than the first time period. The pattern of the pulses that make up the control signal is determined from a look-up table 41.

The pulse generating means 44 generates a series of clock pulses 45 of a 10 millisecond period, which are shown at trace A of FIG. 4. The clock pulses 45 are fed into the pulse train gate means 46.

The pulse train gate means 46 passes a train of pulses that is the product of the control signal 43 and the clock pulses 45 after they have been combined by the pulse train gate means 46 functioning as an AND gate. This train of pulses is shown at trace $C_3$ of FIG. 4. It can be seen that the pulses in this train of pulses correspond in number, within any given first period of time 500 milliseconds, to the number that is chosen by the ozone production adjustment means and displayed by the target rate display means, LCD display 36. The temporal sum of the enable portion of the control signal corresponds to the number displayed by the display means 36. If, for example, a target rate of 20 is chosen, a control signal having an enable portion with a temporal sum equivalent to 20 pulses would be passed by the pulse train gate means 46.

The pulse train gate means 46 actually passes the train of pulses as two separate sub-trains of pulses 47a and 47b, which are shown at traces $C_1$, and $C_2$ of FIG. 4. The sub-trains of pulses 47a and 47b are each fed into a separate one of a pair of MOSFET power transistors 49a and 49b. These MOSFET power transistors 49a, 49b are connected together in electrically conductive reaction to form a push-pull power amplifier that is specifically designed to accommodate pulses having a duration of 10 milliseconds. Each of the power transistors 49a, 49b is selected and configured so as to efficiently handle 5 millisecond pulses, which is half the full 10 second duration of the input pulses. The outputs of the power transistors 49a, 49b are coupled in electrically conductive relation to a centre tap set-up transformer 60, the centre tap of which is electrically connected to ground at 62a. Together, the power transistors 49a, 49b and the step-up transformer 60 form the high voltage pulse generation 48. The output 64 of the transformer 60 is connected in electrically conductive relation to the pair of spaced apart electrodes 26, 28.

As can be seen in FIG. 4, trace A, the train of clock pulses are square waves having a period of ten milliseconds, with the binary "1" portion of the pulse being 5 milliseconds and the binary "0" portion of the pulse also being 5 milliseconds. Shown directly below the train of clock pulses is the control signal, which is trace B. The overall period of the control signal, which is only shown in part, is a first time period of pre-determined length, which is 500 milliseconds in the preferred embodiment. The disable portions of the control signal are represented as a binary "0" and each is at least 10 ms in the preferred embodiment so as to ultimately accommodate the output transistors, which are electrically connected together in a push-pull configuration. The enable portions of the control signal are represented as a binary "1" and are either 10 ms in length or 20 ms in length. In the preferred embodiment, the 10 ms pulses occur first and the 20 ms pulses occur second, but may occur in any order, including combining the 10 ms and 20 ms pulses together. The 20 ms pulses are essentially two concurrent 10 ms pulses. The number of 10 ms pulses, or equivalent, which are the enable portions of the control signal, ultimately determine the amount of ozone generated by the pair of spaced apart electrodes 26, 28 of the ozone generating means 20.

This relation can also be looked at in another manner—the temporal sum of these pulses (which are the enable portions of the control signal) within a predetermined first time period of 500 milliseconds ultimately determines the amount of ozone that is generated. While the amount of ozone generated is therefore directly related to the temporal sum of the enable pulses, it has been found that the relationship is accurately predictable, but it is not a linear relationship. The temporal sum of pulses required to generate ozone at each of the discrete rates, corresponding to the discrete digital input from the ozone production adjustment means (control switches 32, 34), must be determined empirically. Such empirical determination is done by setting the output of the ozone generator at various desired known amounts, preferably in set increments, by way of adjustment of the control switches 32, 34. A value of the temporal sum of the control pulses that is required to produce each discrete level of ozone output is determined and subsequently entered into a look-up table, essentially in the form of the number of pulses required. In the preferred embodiment, as is shown in trace B of FIG. 3, there are actually two numbers. One number is a given number of 10 ms pulses and the other number is a given number of 20 ms pulses. These 10 millisecond and 20 millisecond pulses are spaced relatively evenly throughout the first time period. The pulses representing the enable portion of the control signal are configured in this manner so as to keep the production of ozone relatively constant. This evenness of pulses permits the ozone generator 20 produces a relatively even humming sound, which humming sound is inevitable in this type of ozone generator. In contrast, a more pulsating production of ozone would occur if the pulses were configured so as to start at the beginning of the first time period and continuing only for a portion of the first time period. Such uneven distribution of the pulses could occur if the first portion of the first time period had evenly spaced pulses of a set period therein, and the subsequent disable portion of the control signal had no pulses therein. This would occur in the event that non-maximum ozone production is desired, in which case the number of pulses would be proportional to the target rate of ozone production. Such uneven production of ozone is less efficient due to the rapid deterioration of the high concentration of ozone around the electrodes 26, 28 than if the frequency of pulses was relatively even during the duration of the first time period of 500 ms. Further, an uneven pulsating sound would occur.

The control signal starts at its upwardly rising edge in concurrence with an upwardly rising edge of one of the pulse train pulses, thus causing the two signals to be synchronized. Shown directly below the control signal is a series of pulses, represented by traces C, $C_2$, and $C_3$. It can be seen that the pulses in trace $C_3$ correspond to the pulses in the pulse train as shown in trace A, but only where the control signal is a binary "1" and not where the control signal is a binary "0". The pulses of the trace $C_3$ are those that are passed by the pulse train gate means and are in distinct and separate groups with the number of pulses in each group corresponding to the length of the enable portion of the control signal. The number of pulses in each group therefore also corresponds to the target rate of ozone gas molecule production from the control signal generation means 44. Correspondingly, since the length of the enable portion of the control signal varies but the length of one period of the control signal does not vary, the number of pulses that occur in the pre-determined first time period of 0.5 seconds varies with the target rate of ozone gas molecule production. Traces $C_1$ and $C_2$ represent the separate sub-trains of pulses that make up the train of pulses as shown in trace $C_3$.

Immediately below trace $C_3$ is trace D, which represents the high voltage pulses generated by the high voltage pulse generator 48. There is a one to one correspondence between the pulses in trace $C_3$ and the high voltage pulses in trace D. Resultingly, the number of high voltage pulses in each first time period of 0.5 seconds delivered to the high voltage pulse generator 48 corresponds to the target rate of ozone gas molecule production.

In the preferred embodiment, there is also a temperature sensor 50 and a feed gas flow sensor 52. The temperature sensor 50 senses the temperature of the oxygen gas molecules entering into the ozone generating means 20 and feeds a signal representative of this temperature into a sensor signal conditioning circuit 54. The feed gas flow sensor 52 senses the rate of flow of oxygen gas molecules entering the ozone generating means 20 and feeds a signal representative of this rate of flow into the sensor signal conditioning circuit 54. The resulting signal from the sensor signal conditioning circuit 54 is fed into the microprocessor 40, which uses this signal to drive displays on the protective housing that allows the flow rate of the oxygen gas molecules to be visually checked after the rate has been initially set, and the temperature to be visually monitored.

In an alternative embodiment, it is contemplated that the electronic control circuit of the present invention is adapted for use with a laser type ozone generating means. The electronic circuit further comprises a laser input pulse generating means that produces electrical pulses that are adapted for input to the laser type ozone generating means. The operation of such a pulsed laser type ozone generating means is otherwise as described above. The specific values entered into a look-up table to determine the number of discrete laser pulses for any given target rate of ozone generation, and the time periods, may differ for a pulsed laser ozone generator, but the principals of operation remain the same as discussed above.

Other modifications and alterations may be used in the design and manufacture of the electronic control circuit of the present invention without departing from the spirit and scope of the accompanying claims.

What is claimed is:

1. An electronic control circuit for accurately controlling the rate of generation of ozone gas molecules, for use in conjunction with an ozone generating means, said electronic control circuit comprising:

a source of electrical power;

ozone production adjustment means for generating a first signal which is indicative of a target rate of ozone gas molecule production;

control signal generation means for accepting said first signal from said ozone production adjustment means, and for generating a control signal a predetermined length first time period and comprising a plurality of consecutive enable and disable portions, where the temporal sum of said enable portions within said first time period is representative of said first signal from said ozone production adjustment means;

pulse generating means;

pulse train gate means having conductive and non-conductive states, where said conductive state is enabled by said enable portion of said control signal a train of pulses from said pulse generating means is passed by said pulse train gate means, and wherein said pulses in said train of pulses correspond to said enable portions of said control signal within said first time period;

wherein, in response to said enable portion of said control signal from said control signal generation means, said pulse train gate means passes said train of pulses, and wherein the time period of one cycle of said first and second portions of each of said pulses is a second time period which is shorter than said first time period;

wherein, in response to said disable portion of said control signal from said control signal generation means, said pulse train gate assumes its non-conductive state;

wherein said train of pulses that is passed by said pulse train gate means is fed to said ozone generating means so as to cause generation of ozone therewithin during the occurrence of said pulses; and whereby the amount of ozone generated during said first time period is directly related to the temporal sum of the enable portions of pulses in said train of pulses passed by said pulse train gate means during said first time period, so as to thereby provide accurate control of the amount of ozone gas molecules being generated.

2. The electronic circuit of claim 1, wherein said control signal generation means also generates a synchronizing signal, which is input to said pulse train gate means, wherein said pulse train gate means accepts said synchronizing signal and uses said synchronizing signal to synchronize said control signal with said train of pulses.

3. The electronic circuit of claim 1, wherein said first time period of predetermined length is a constant length for all values of said target rate of ozone gas molecule production.

4. The electronic circuit of claim 3, wherein said first time period is 500 milliseconds.

5. The electronic circuit of claim 1, wherein said enable portions and said disable portions occur alternatingly.

6. The electronic circuit of claim 1, wherein a first quantity of said enable portions are about 10 milliseconds in duration and a second quantity of said enable portions are about 20 milliseconds in duration.

7. The electronic circuit of claim 1, wherein said first quantity of enable portions occur prior to said second quantity of enable portions.

8. The electronic circuit of claim 1, wherein said disable portions are about 10 milliseconds in duration.

9. The electronic circuit of claim 1, wherein said pulses are square wave pulses.

10. The electronic circuit of claim 1, further comprising target rate display means for displaying said target rate of ozone gas molecule production.

11. The electronic circuit of claim 10, wherein said target rate display means is an electronic digital display means.

12. The electronic circuit of claim 11, wherein said electronic digital display means is a liquid crystal display.

13. The electronic circuit of claim 1, further comprising a high voltage pulse generating means that produces high voltage electrical pulses corresponding to each pulse of said train of pulses, wherein said pulses are fed into said ozone generating means.

14. The electronic circuit of claim 13, wherein said ozone generating means is an electrode type ozone generating means having a pair of spaced apart electrodes within an ozone generating chamber, and adapted to receive high voltage electrical pulses and to use said high voltage electrical pulses in order to generate ozone within said ozone generating chamber; and wherein said train of pulses that is passed by said pulse train gate means is fed to said high voltage pulse generating means, and said high voltage electrical pulses are imposed across said pair of spaced apart electrodes so as to cause generation of ozone within said ozone generating chamber during the occurrence of said high voltage electrical pulses.

15. The electronic circuit of claim 1, wherein said ozone generating means is a laser type ozone generating means, and wherein said electronic circuit further comprises a laser input pulse generating means that produces electrical pulses that are adapted for input to said laser type ozone generating means.

* * * * *